US012561625B2

(12) United States Patent
 Kumazaki

(10) Patent No.: US 12,561,625 B2
(45) Date of Patent: Feb. 24, 2026

(54) DISPATCH MANAGEMENT DEVICE

(71) Applicant: TOYOTA JIDOSHA KABUSHIKI KAISHA, Toyota (JP)

(72) Inventor: Kenta Kumazaki, Bunkyo-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/936,420

(22) Filed: Nov. 4, 2024

(65) Prior Publication Data

US 2025/0148383 A1 May 8, 2025

(30) Foreign Application Priority Data

Nov. 8, 2023 (JP) .................................. 2023-190755

(51) Int. Cl.
 *G06Q 10/0631* (2023.01)
 *G06Q 50/40* (2024.01)

(52) U.S. Cl.
 CPC ..... *G06Q 10/063112* (2013.01); *G06Q 50/40* (2024.01)

(58) Field of Classification Search
 CPC .............................................. G06Q 10/063112
 See application file for complete search history.

(56) References Cited

U.S. PATENT DOCUMENTS

| | | | | |
|---|---|---|---|---|
| 2016/0187150 A1* | 6/2016 | Sherman | ........ | G06Q 10/063114 |
| | | | | 705/7.15 |
| 2017/0124505 A1* | 5/2017 | Nakfour | .................. | H04W 4/90 |
| 2020/0134525 A1* | 4/2020 | Goldman | .......... | G06Q 10/0631 |
| 2022/0044572 A1* | 2/2022 | Sakurada | .......... | B60W 50/0097 |

FOREIGN PATENT DOCUMENTS

| | | |
|---|---|---|
| JP | 2021-022260 A | 2/2021 |
| JP | 2021-026437 A | 2/2021 |

OTHER PUBLICATIONS

Stonemountain VW, "Does the Color of Your Car Really Make It Hotter?", Apr. 2016. https://www.stonemountainvw.com/does-the-color-of-your-car-really-make-it-hotter/#:~:text=In%20short%2C%20this%20thermodynamic%20principle,how%20hot%20your%20car%20gets. (Year: 2016).*
Yusuf et al., Effect of cold start emissions from gasoline-fueled engines of light-duty vehicles at low and high ambient temperatures: Recent trends, Case Studies in Thermal Engineering, vol. 14, Sep. 2019, pp. 1-10 (Year: 2019).*

* cited by examiner

*Primary Examiner* — Rupangini Singh
(74) *Attorney, Agent, or Firm* — Dinsmore & Shohl LLP

(57) ABSTRACT

A dispatch management device includes a processor configured to: set, for each of a plurality of candidate vehicles that can be dispatched, a priority of the candidate vehicle in response to external environment and characteristics of the candidate vehicle associated with the external environment so that the priority becomes higher as a degree of suitability of the characteristics of the candidate vehicle with respect to the external environment increases, and determine a vehicle to be dispatched from among the plurality of candidate vehicles in response to the priority of each of the plurality of candidate vehicles.

4 Claims, 5 Drawing Sheets

DISPATCH MANAGEMENT DEVICE

CROSS-REFERENCE TO RELATED APPLICATIONS

This application claims priority to Japanese Patent Application No. 2023-190755 filed Nov. 8, 2023, the entire contents of which are herein incorporated by reference.

FIELD

The present disclosure relates to a dispatch management device for dispatching a vehicle.

BACKGROUND

A technique for improving dispatch efficiency has been proposed (see Japanese Unexamined Patent Publication JP2021-22260A). The dispatch management control device disclosed in JP2021-22260A searches candidate vehicles that meet a condition of order information including position information of a dispatch position, notifies each candidate vehicle of occurrence of a dispatch order, acquires answer information on whether or not to accept the dispatch order from each candidate vehicle, and notifies one of the candidate vehicles that can be accepted of the dispatch instruction.

SUMMARY

In the above-described technique, when determining a vehicle to be dispatched, the environment in which the vehicle is used is not taken into consideration. Therefore, in some cases, a vehicle that is not necessarily suitable for the environment to be used may be dispatched.

Accordingly, it is an object of the present disclosure to provide a dispatch management device that can facilitate to dispatch a vehicle suitable for an environment around the vehicle during use of the vehicle.

According to one embodiment, a dispatch management device is provided. The dispatch management device includes a processor configured to: set, for each of a plurality of candidate vehicles that can be dispatched, a priority of the candidate vehicle in response to external environment and characteristics of the candidate vehicle associated with the external environment so that the priority becomes higher as a degree of suitability of the characteristic of the candidate vehicle with respect to the external environment increases, and determine a vehicle to be dispatched from among the plurality of candidate vehicles in response to the priority of each of the plurality of candidate vehicles.

In the dispatch management device, the external environment includes outside temperature, and the characteristics include a body color. The processor sets the priority for each of the plurality of candidate vehicles so that the priority of the candidate vehicle becomes higher as a density of the body color of the candidate vehicle is lower when the outside temperature is equal to or higher than a predetermined high temperature threshold, and the priority of the candidate vehicle becomes higher as the density of the body color of the candidate vehicle is higher when the outside temperature is equal to or less than a predetermined low temperature threshold.

Further, in the vehicle dispatch management device, the external environment includes weather, and the characteristics include presence or absence of the photovoltaic panel. The processor increases the priority of the candidate vehicle including the photovoltaic panel among the plurality of candidate vehicles as the weather becomes better.

Alternatively, in the dispatch management device, the external environment includes outside temperature, and the characteristics include an elapsed time from a previous use. The processor sets the priority for each of the plurality of candidate vehicles so that the priority of the candidate vehicle becomes higher as the elapsed time of the candidate vehicle is shorter when the outside temperature is less than a predetermined temperature.

Alternatively, in the dispatch management device, the external environment includes a road surface condition, and the characteristics include a drive system. The processor sets the priority of the candidate vehicle having a four-wheel drive system among the plurality of candidate vehicles to be higher than the priority of the candidate vehicle having the other drive system when a friction coefficient of the road surface is estimated to be lower than a predetermined value.

The dispatch management device according to the present disclosure has an effect of being able to facilitate to dispatch a vehicle suitable for an environment around the vehicle during use of the vehicle.

DESCRIPTION OF EMBODIMENTS

Hereinafter, a dispatch management device, a dispatch management method, a computer program for dispatch management, and a dispatch management system including the dispatch management device will be described with reference to the drawings. The dispatch management device determines a vehicle to be actually dispatched from among a plurality of candidate vehicles in consideration of an environment surrounding the dispatched vehicle (hereinafter, referred to as external environment) when the vehicle is used. That is, for each candidate vehicle, the dispatch management device sets a priority level such that the higher the degree of suitability of the characteristics of the candidate vehicle related to the external environment, the higher the priority level, and determines, from among the plurality of candidate vehicles, a vehicle to be actually dispatched based on the priority level set for each candidate vehicle.

Figure 1:
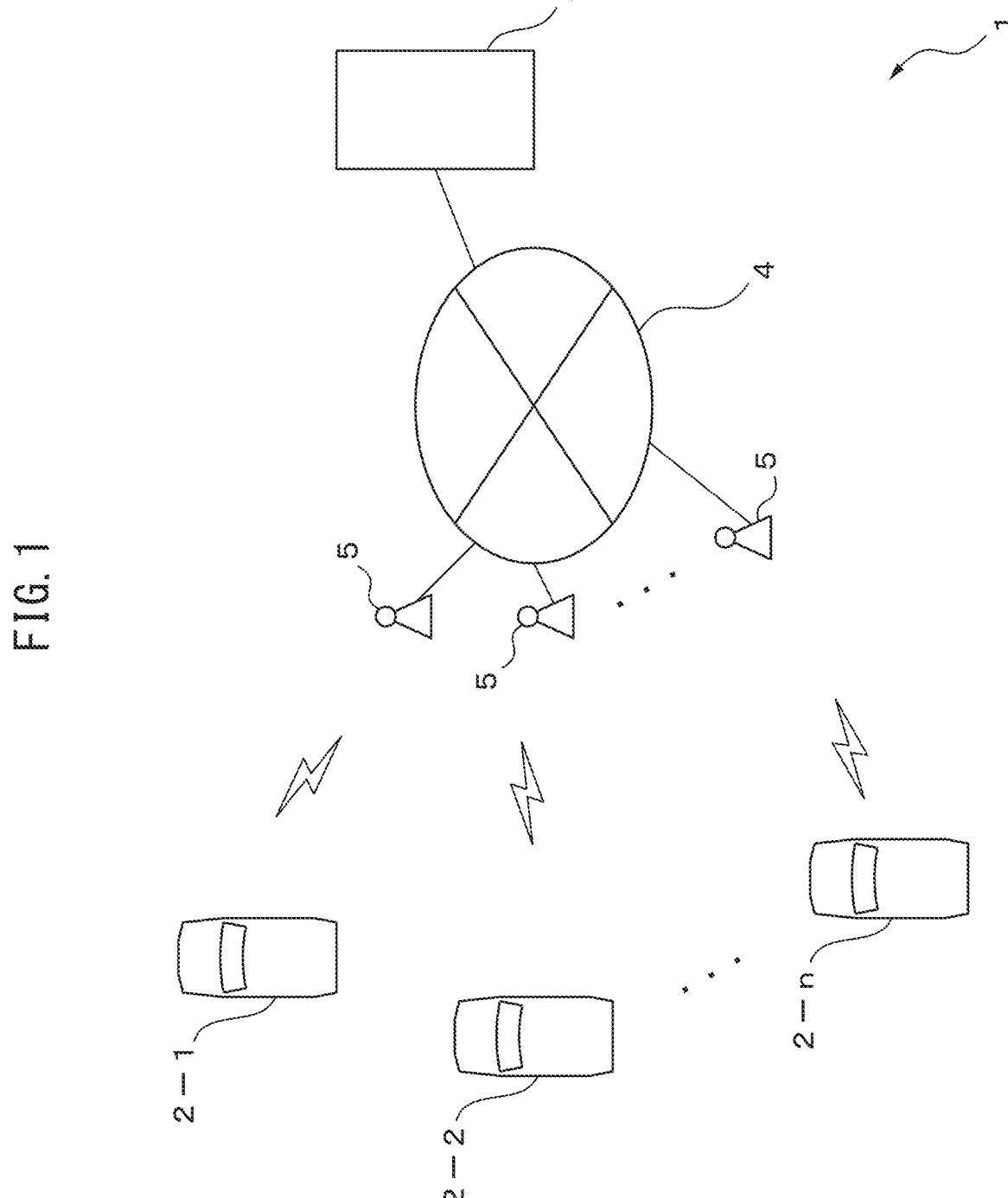
FIG. 1 is a schematic configuration diagram of a dispatch management system in which a dispatch management device according to an embodiment is implemented.

FIG. 1 is a schematic configuration diagram of a dispatch management system in which a dispatch management device according to an embodiment is implemented. The dispatch management system 1 includes a plurality of vehicle 2-1 to 2-*n* that can be dispatched (n is an integer of 2 or more), and a server 3 that is an example of the dispatch management device. Each of the plurality of vehicular 2-1 to 2-*n* can communicate with the servers 3 via a communication network 4 and a wireless base station 5 connected to the communication network 4 via a gateway (not shown). The server 3 is connected to the communication network 4 via, for example, a gateway (not shown). The server 3 determines a vehicle to be dispatched from among the plurality of vehicle 2-1 to 2-*n* in response to a dispatch request from a user and transmits a pick-up instruction to the determined vehicle.

The dispatch management system 1 may further include one or more portable terminals (not shown) capable of communicating with the server 3 via the wireless base station 5 and the communication network 4. Such a mobile terminal may be, for example, a mobile phone carried by a user. Then, the mobile terminal transmits to the server 3 via the wireless base station 5 and the communication network 4 in accordance with the user's operation, a dispatch request including identification information of the user and information indicating a location where the user plans to get in the dispatched vehicle (hereinafter, referred to as a planned boarding location). The server 3 may be connected to a user information server (not shown) that manages user information via the communication network 4. In this case, the server 3 may receive the dispatch request from the user information server via the communication network 4. Further, the server 3 may be connected to a weather information server (not shown) that distributes weather information such as weather and temperature of each place via the communication network 4.

The dispatch request may further include information indicating at least one of a scheduled boarding date and time of the user, a location where the user plans to get out of the dispatched vehicle (hereinafter, referred to as a planned getting-out location), a planned traveling route from the planned boarding location to the planned getting-out location, an expected number of passengers, a desired vehicle type, and a desired option.

Each of the plurality of vehicle 2-1 to 2-*n* may be a vehicle capable of providing a mobility service such as a taxi service, and may be an autonomous vehicle. To this end, each of the plurality of vehicular 2-1 to 2-*n* includes, for example, a wireless communication terminal (not shown), an electronic control unit (ECU, not shown), and a positioning device (not shown). The wireless communication terminal has a wireless communication function and is configured to be able to communicate with the wireless base station 5. The ECU controls autonomous driving of the vehicle and controls each unit of the vehicle. The positioning device is configured to measure the position of the vehicle and may include, for example, a receiver for receiving a Global Positioning System (GPS) signal and computing circuitry for calculating the position of the vehicle from GPS signals. Further, each of the plurality of vehicle 2-1 to 2-*n* may include a storage device (not shown) for storing map information, and a navigation system (not shown) for determining a traveling route from the present position of the vehicle to the travel destination.

Furthermore, each of the plurality of vehicle 2-1 to 2-*n* may have an external sensor (not shown) for obtaining information about the surroundings of the vehicle. The external sensor may be, for example, a camera provided to capture an image of the surroundings of the vehicle, or a ranging sensor such as a radar or a LiDAR sensor for detecting a distance to an object present around the vehicle. The wireless communication terminal, the positioning device, the storage device, the navigation system, and the external sensor are communicably connected to the ECU via an in-vehicle network (not shown) compliant with a standard such as a Controller Area Network (CAN) provided in the vehicle.

In each of the plurality of vehicle 2-1 to 2-*n*, when a pick-up instruction is notified from the server 3 via the wireless communication terminal, the ECU returns a signal indicating that the pick-up instruction has been received to the server 3 via the wireless communication terminal. In a case where the pick-up instruction cannot be fulfilled, such as a case where the remaining fuel or the remaining capacity of the battery of the vehicle that has received the pick-up instruction is less than a predetermined lower limit threshold, the ECU may return a signal indicating that fulfilling of the pick-up instruction is impossible to the server 3 via the wireless communication terminal. In addition, the ECU notifies the navigation system of the planned boarding location designated by the pick-up instruction when there is no reason to be unable to fulfill the pick-up instruction. Then, the navigation system refers to the map information and searches a traveling route from the current position of the vehicle measured by the positioning device to the planned boarding location. Similarly, when the user gets into the vehicle at the notified planned boarding location, the navigation system refers to the map information and searches a traveling route from the planned boarding location to the planned getting-out location. Then, the navigation system notifies the ECU of the determined traveling route. The ECU executes autonomous driving control of the vehicle so that the vehicle moves to the planned boarding location or the planned getting-out location along the traveling route. At this time, the ECU may control the velocity of the vehicle so that the distance from other objects existing around the vehicle is maintained at a predetermined value or more by using the information about the vehicle surroundings obtained by the external sensor. When the planned traveling route is included in the pick-up instruction received from the server 3, the ECU may execute autonomous driving control of the vehicle so that the vehicle moves to the planned boarding location or the planned getting-out location along the planned traveling route included in the pick-up instruction. Further, the ECU transmits the present position of the vehicle measured by the positioning device, together with the identification information of the vehicle, to the servers 3 via the wireless communication terminal at predetermined intervals (for example, 30 seconds, 1 minute, or 5 minutes). Furthermore, when the ECU detects that the user has gotten in the vehicle at the planned boarding location notified from the server 3, the ECU transmits a signal indicating that the user has gotten in the vehicle, a position of the vehicle measured by the positioning device and a time obtained from an in-vehicle clock (not shown) when the user got in the vehicle to the server 3 via the wireless communication terminal together with the identification information of the vehicle. Similarly, when the ECU detects that the user has gotten out of the vehicle, the ECU transmits a signal indicating that the user has gotten out of the vehicle, a position of the vehicle measured by the positioning device and a time obtained from the in-vehicle clock when the user got out of the vehicle to the server 3 via the wireless communication terminal together with the identification information of the vehicle. Note that when the ECU detects that the door of the vehicle has been opened at the planned boarding location by an opening and closing sensor (not shown) of the door, the ECU determines that the user has gotten in the vehicle. Similarly, ECU determines that the user has gotten out of the vehicle when the door opening/closing sensor detects that the door of the vehicle has been opened at the planned getting out location of the vehicle who is getting on the vehicle. The ECU may detect the user gets in or gets out of the vehicle based on a sensor signal obtained by another sensor provided in a passenger compartment of the vehicle, such as a camera for monitoring the passenger compartment or a seating sensor.

Note that each of the plurality of vehicle 2-1 to 2-n may be a vehicle that is manually driven by a driver.

The servers 3 select one or more candidate vehicles in response to the received dispatch request among the plurality of vehicle 2-1 to 2-n, and set a priority for each of the selected candidate vehicles. Then, the server 3 determines a vehicle to be dispatched from among the candidate vehicles based on the priority of each candidate vehicle and transmits a pick-up instruction to the determined vehicle via the communication network 4 and the wireless base station 5.

Figure 2:
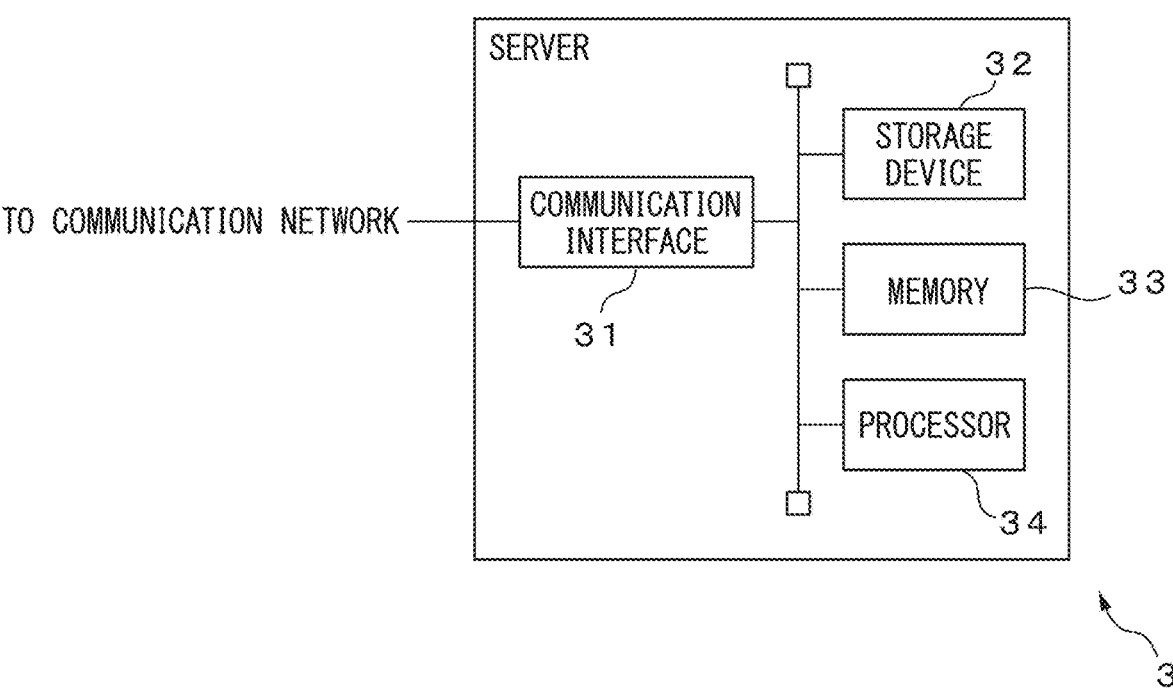
FIG. 2 is a schematic configuration diagram of a server, which is an example of a dispatch management device.

FIG. 2 is a schematic configuration diagram of the server 3, which is an example of the dispatch management device. The server 3 includes a communication interface 31, a storage device 32, a memory 33, and a processor 34. The communication interface 31, the storage device 32, and the memory 33 are connected to the processor 34 via a signal line.

The communication interface 31 is an example of a communication unit, and includes an interface circuit for connecting the server 3 to the communication network 4. The communication interface 31 is configured to be able to communicate with respective wireless communication terminals of a plurality of vehicular 2-1 to 2-n and a mobile terminal carried by a user via the communication network 4 and the wireless base station 5. The communication interface 31 is also configured to be able to communicate with the user information server and the weather information server via the communication network 4. Then, the communication interface 31 passes a signal which is received from the wireless communication terminal of any vehicle via the wireless base station 5 and the communication network 4 and represents the current position of the vehicle etc., to the processor 34. In addition, the communication interface 31 passes a dispatch request received from the mobile terminal or the user information server via the communication network 4 (and the wireless base station 5) to the processor 34. Further, the communication interface 31 passes weather information received from the weather information server via the communication network 4 to the processor 34. Furthermore, the communication interface 31 transmits a pick-up instruction to a designated vehicle received from the processor 34 to the designated vehicle via the communication network 4 and the wireless base station 5.

The storage device 32 is an example of a storage unit and includes, for example, a Solid-State Drive (SSD). The storage device 32 may include a hard disk device, an optical recording medium, and an access device thereof. The storage device 32 stores vehicle information for each of the vehicle 2-1 to 2-n. The vehicle information includes identification information of the vehicle, a type of the vehicle, characteristic information indicating characteristics of the vehicle, a current position of the vehicle, presence or absence of various optional equipment, and a state flag indicating a service providing state (for example, in a standby state, in a pick-up state, or in a user ride state). The storage device 32 also stores map information. Further, the storage device 32 stores a priority table indicating a relationship between characteristics of the vehicle, external environment, and a priority. Furthermore, the storage device 32 may store a computer program for executing the dispatch management process.

The characteristic information includes, for example, at least one of a body color, the presence or absence of a photovoltaic panel and a sunshade, a type of a drive system, a type of a power source, a height of a center of gravity, an occupant capacity, and an elapsed time since the time when the service providing state becomes a standby state (that is, an elapsed time from the previous use of the vehicle).

The memory 33 is another example of a storage unit, and includes, for example, a nonvolatile semiconductor memory and a volatile semiconductor memory. The memory 33 stores various data generated during the execution of the dispatch management process, various data received from other devices, and the like.

The processor 34 is an example of a control unit and includes one or more Central Processing Units (CPUs) and peripheral circuitry thereof. The processor 34 may further include other arithmetic circuits such as a logical arithmetic unit or a numerical arithmetic unit. Each time weather information is received from the weather information server, the processor 34 stores the received weather information in the memory 33 or the storage device 32. When the processor 34 receives information indicating the current position of the vehicle from any of the plurality of vehicle 2-1 to 2-n, the processor 34 stores the current position of the vehicle together with the identification information of the vehicle in the storage device 32. Further, the processor 34 transmits a pick-up instruction to any vehicle, and upon receiving a signal indicating that the pick-up instruction has been received from the vehicle, the processor 34 updates the value of the state flag of the vehicle to a value indicating that the vehicle is picking up. Further, when the processor 34 receives a signal indicating that the user has ridden from any of the plurality of vehicle 2-1 to 2-n, the processor 34 updates the value of the status flag of the vehicle to a value indicating that the user is riding. Similarly, when the processor 34 receives a signal from any of the plurality of vehicle 2-1 to 2-n indicating that the user has gotten out, the processor 34 updates the value of the status flag of the vehicle to a value indicating that the vehicle is on standby. Further, upon receiving the dispatch request, the processor 34 executes the dispatch management process.

Figure 3:
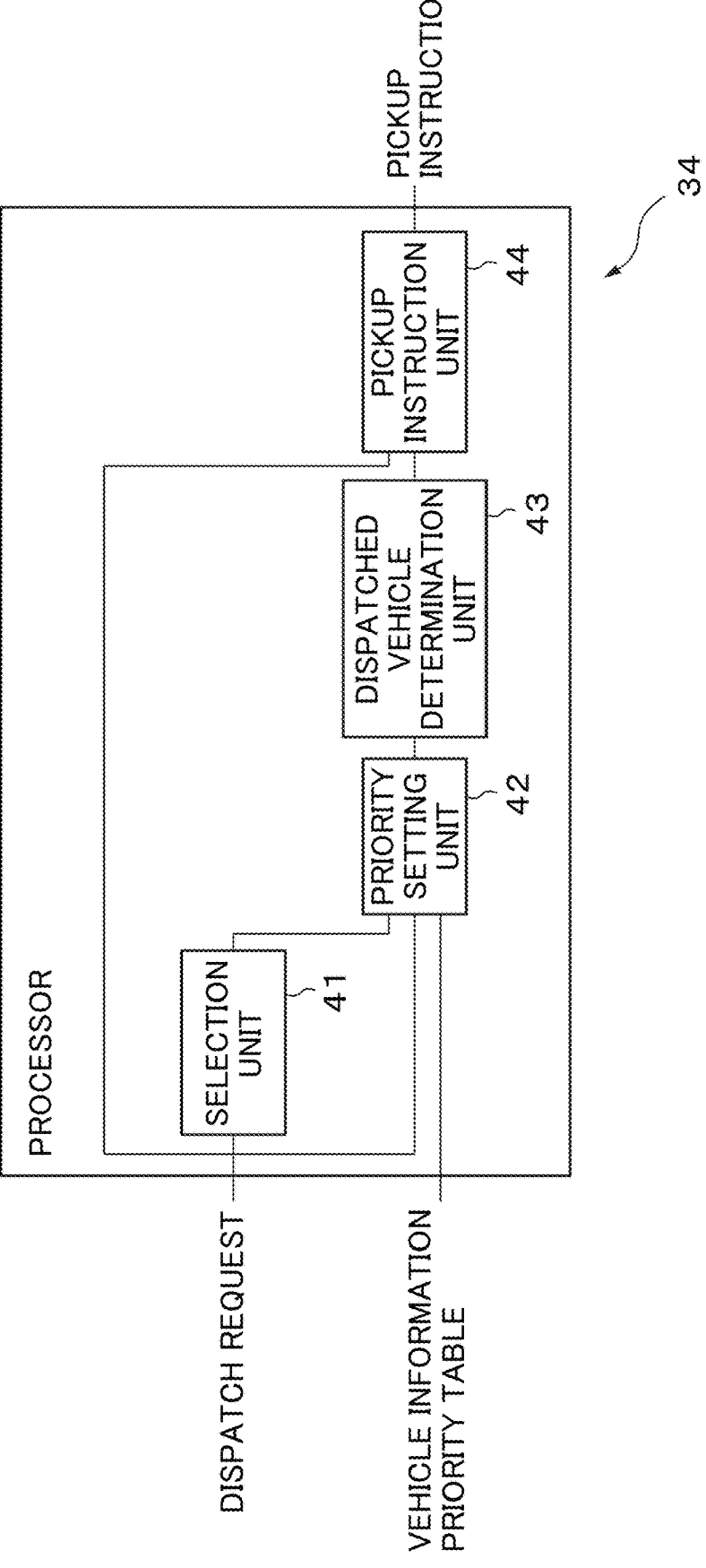
FIG. 3 is a functional block diagram of a processor of a server related to a dispatch management process.

FIG. 3 is a functional block diagram of the processor 34 associated with the dispatch management process. The processor 34 includes a selection unit 41, a priority setting unit 42, a dispatched vehicle determination unit 43, and a pickup instruction unit 44. Each of these units included in the processor 34 is, for example, a functional module implemented by a computer program running on the processor 34. Alternatively, each of these units may be a dedicated operating circuit provided in the processor 34.

When the server 3 receives the dispatch request, the selection unit 41 selects one or more vehicles capable of satisfying the dispatch request from among the vehicle 2-1 to 2-n as the candidate vehicles. For this purpose, the selection unit 41 refers to the state flags of the respective vehicles and identifies each vehicle of which the value of the state flag indicates the standby state. Further, the selection unit 41 selects, as a candidate vehicle, one or more vehicles that can be moved to the planned boarding location designated by the dispatch request within a predetermined time (for example, within 10 minutes or within 15 minutes) from among the identified vehicles. For this purpose, the selection unit 41 refers to the map information to search for a route from the current position of the vehicle to the planned boarding location by a predetermined route searching method such as the Dijkstra method, and predicts a time required to move to the planned boarding location based on the searched route. The selection unit 41 selects, as a candidate vehicle, a vehicle whose predicted required time is equal to or less than a predetermined time from among the identified vehicles. In a case where the scheduled boarding date and time is included in the dispatch request, the selection unit 41 may select, as a candidate vehicle, a vehicle whose predicted required time is shorter than the period from the current time to the scheduled boarding date and time from among the identified vehicles. In addition, in a case where the expected number of passengers is included in the dispatch request, the selection unit 41 excludes each vehicle whose occupant capacity is smaller than the expected number of passengers from the candidate vehicles.

The selection unit 41 notifies the priority setting unit 42 of the identification information of each candidate vehicle.

The priority setting unit 42 sets a priority to be dispatched for each candidate vehicle. In the present embodiment, for each candidate vehicle, an item priority is set for each of at least one item, and a weighted sum of the item priorities set for each item is the priority of the candidate vehicle. In the present embodiment, the item priority is set for each of the degree of suitability of the characteristics of the candidate vehicle with respect to a plurality of external environments described later (hereinafter, may be referred to as external environment suitability for convenience). Note that the item priority may not necessarily be set for all the external environment suitability, and for example, the item priority may be set for at least one of the external environment suitability.

In addition, the item to which the item priority is set may include any one of a desired vehicle type, presence or absence of a desired option, and a required time to a planned boarding location, in addition to the external environment suitability. For example, when the desired vehicle type is included in the dispatch request, the priority setting unit 42 refers to the vehicle information of each candidate vehicle and sets the item priority regarding the desired vehicle type for each candidate vehicle. For example, the priority setting unit 42 sets the item priority regarding the desired vehicle type for each candidate vehicle such that the item priority for the candidate vehicle of the same vehicle type as the desired vehicle type is higher than the item priority for the candidate vehicle of the different vehicle type from the desired vehicle type. Similarly, when the desired option is included in the dispatch request, the priority setting unit 42 refers to the vehicle information of each candidate vehicle and sets the item priority regarding the desired option for each candidate vehicle. For example, the priority setting unit 42 sets the item priority regarding the desired option for each candidate vehicle so that the item priority for the candidate vehicle having the desired option is higher than the item priority for the candidate vehicle having no desired option. Furthermore, the priority setting unit 42 sets the item priority regarding the required time for each candidate vehicle so that the item priority becomes higher as the required time to the planned boarding location is shorter. When the item priority for items other than the external environment suitability is not set, the item priority set based on the external environment suitability becomes the priority itself.

Hereinafter, the details of the item priority setting related to the external environment suitability will be described. The priority setting unit 42 refers to the vehicle information, the weather information, and the priority table of each candidate vehicle to set the item priority regarding the external environment suitability for each candidate vehicle. In the present embodiment, the priority table indicates the relationship between the external environment, the characteristics of the vehicle, and the item priority. When there are a plurality of items to be evaluated for the external environment suitability, the item priority may be set for each of the plurality of items. Hereinafter, for convenience, the item priority regarding the external environment suitability may be simply referred to as the item priority. Further, in the example described below, as the external environment at the place and the date and time where the dispatched vehicle is used, the planned boarding location specified in the dispatch request and the external environment when the server 3 receives the dispatch request are referred to. However, the present disclosure is not limited thereto, and in a case where the scheduled boarding date and time is included in the dispatch request, the external environment at the scheduled boarding date and time may be referred to as the external environment at the date and time when the dispatched vehicle is used. In addition, in a case where the planned getting-out location or the planned traveling route is included in the dispatch request, the external environment at the planned getting-out location or the external environment at an arbitrary position on the scheduled traveling route may be referred to as the external environment at the location where the dispatched vehicle is used.

For example, the priority setting unit 42 sets the item priority for each candidate vehicle based on the outside temperature at the planned boarding location included in the weather information and the body color of each candidate vehicle. When the outside temperature is equal to or higher than a predetermined high-temperature threshold (for example, 25° C. or 30° C.), the priority setting unit 42 sets the item priority for each candidate vehicle so that the item priority is lower as the density of the body color of the candidate vehicle is higher. That is, the item priority of the candidate vehicle having the body color which is the light color such as white, silver, light gray, or light blue is set higher than the item priority of the candidate vehicle having the body color which is the dark color such as black, dark blue, or dark gray. This is because, when the outside temperature is high, the temperature in the vehicle interior tends to increase when the density of the body color is high, and as a result, the power consumption of the air conditioner also increases. Therefore, by setting the item priority as described above, the priority setting unit 42 can increase the item priority of the candidate vehicle that requires relatively little power consumption of the air conditioner when the outside temperature is high.

Furthermore, when the outside temperature is equal to or lower than a predetermined low-temperature threshold, the priority setting unit 42 may set the item priority for each candidate vehicle so that the item priority is higher as the density of the body color of the candidate vehicle is higher. The low temperature threshold is set to a temperature lower than the high temperature threshold (for example, 10° C. or 15° C.). As a result, the item priority of the candidate vehicle having the dark body color, which is relatively likely to increase in the vehicle interior temperature when the outside temperature is low, is set high. In order to set the item priority regarding the degree of suitability of the body color with respect to the outside temperature as described above, the priority table represents the value of the item priority for each body color when the outside temperature is equal to or higher than the high temperature threshold and the value of the item priority for each body color when the outside temperature is equal to or lower than the low temperature threshold.

The priority setting unit 42 may set the item priority for each candidate vehicle on the basis of the weather of the planned boarding location shown in the weather information and the presence or absence of the photovoltaic panel of each candidate vehicle. At this time, the priority setting unit 42 increases the item priority of the candidate vehicle having the photovoltaic panel as the weather at the planned boarding location becomes better, that is, as the precipitation probability included in the weather information decreases. This increases the likelihood that power can be generated while the dispatched vehicle is in use, and thus improvements in fuel consumption and electric power consumption of the entire system are expected. The priority setting unit 42 may set the item priority of the candidate vehicle having the photovoltaic panel lower than the item priority of the candidate vehicle not including the photovoltaic panel when the weather at the planned boarding location is a weather in which power generation by the photovoltaic panel is not expected, such as rain or snow.

Further, the priority setting unit 42 may set the item priority for each candidate vehicle on the basis of the outside temperature at the planned boarding location included in the weather information and the elapsed time from the previous use of each candidate vehicle (hereinafter, may be simply referred to as the elapsed time for convenience). When the outside temperature is less than a predetermined temperature (for example, 10° C. or 15° C.), the priority setting unit 42 increases the item priority of the candidate vehicle as the elapsed time of the candidate vehicle becomes shorter. As a result, the time required for warm-up operation of the dispatched vehicle is shortened, so that improvement in fuel consumption and electric power consumption of the entire dispatch management system is expected.

Furthermore, the priority setting unit 42 sets the item priority of the candidate vehicle having the sunshade in the case where the outside temperature at the planned boarding location included in the weather information is equal to or higher than the predetermined high temperature threshold and the weather shown in the weather information is fine, higher than that in the case where the outside temperature is lower than the high temperature threshold or the weather is not fine. Furthermore, in a case where the outside temperature at the planned boarding location is equal to or higher than the predetermined high temperature threshold and the weather is fine, in some embodiments, the priority setting unit 42 sets the item priority of the candidate vehicle having the sunshade higher than the item priority of the candidate vehicle having no sunshade. This increases the likelihood that the vehicle having the sunshade will be dispatched when the outside temperature is high and the weather is fine, and it is expected that the comfort of the user will be improved.

Furthermore, the priority setting unit 42 may set the item priority for each candidate vehicle on the basis of the road surface condition assumed from the weather of the planned boarding location shown in the weather information and the drive system of each candidate vehicle. When it is estimated that the friction coefficient of the road surface at the planned boarding location is lower than a predetermined value, the priority setting unit 42 may set the item priority of the candidate vehicle having a four-wheel drive system higher than the item priority of the candidate vehicle having the other drive system, in particular, the candidate vehicle having the front-wheel drive system. Note that the priority setting unit 42 estimates that the friction coefficient of the road surface is lower than the predetermined value when the weather is snow, or when the weather at the planned boarding location is rain or snow within the latest predetermined period and the outside temperature is a temperature at which freezing of the road surface can occur. Accordingly, it is expected that a vehicle that is difficult to slip even in a road surface condition having a low coefficient of friction will be dispatched, and safety will be improved.

Furthermore, in a case where the predicted value of the wind speed of the planned boarding location included in the weather information is equal to or higher than a predetermined speed, in some embodiments, the priority setting unit 42 sets the item priority of the candidate vehicle whose height of the center of gravity is equal to or higher than a predetermined height to be lower than the item priority of the candidate vehicle whose height of the center of gravity is lower than the predetermined height. As a result, a vehicle having a low center of gravity is likely to be dispatched when the wind is strong, and thus it is expected that safety is improved.

Furthermore, the priority setting unit 42 may reduce the item priority of the candidate vehicles that are Battery Electric Vehicle (BEV) as the outside temperature of the planned boarding location included in the weather information is lower. As a result, it is possible to improve the fuel efficiency and the power efficiency of the entire dispatch management system because BEV which increases energy consumption for heating is difficult to be distributed when the outside temperature is lower.

For each candidate vehicle, the priority setting unit 42 sets the weighted sum of the individual item priorities set for the candidate vehicle as the final priority for the candidate vehicle. The weighting factors for each item priority may all be the same, or the weighting factors for any item may be greater than the weighting factors for other items. For example, the weight coefficient of the item related to the safety of the vehicle may be set to be larger than the weight coefficient of the item related to the other item. Then, the priority setting unit 42 notifies the dispatched vehicle determination unit 43 of the priority set for each candidate vehicle.

The dispatch vehicle determination unit 43 determines a vehicle to be dispatched from among the candidate vehicles based on the priority set for each candidate vehicle. In the present embodiment, the dispatched vehicle determination unit 43 determines the candidate vehicle having the highest priority among the candidate vehicles as the vehicle to be dispatched. When a signal indicating that the vehicle cannot be picked up is received from the vehicle to which the server 3 has transmitted the pick-up instruction, the dispatched vehicle determination unit 43 determines the candidate vehicle having the next higher priority as the vehicle to be dispatched.

Figure 4:
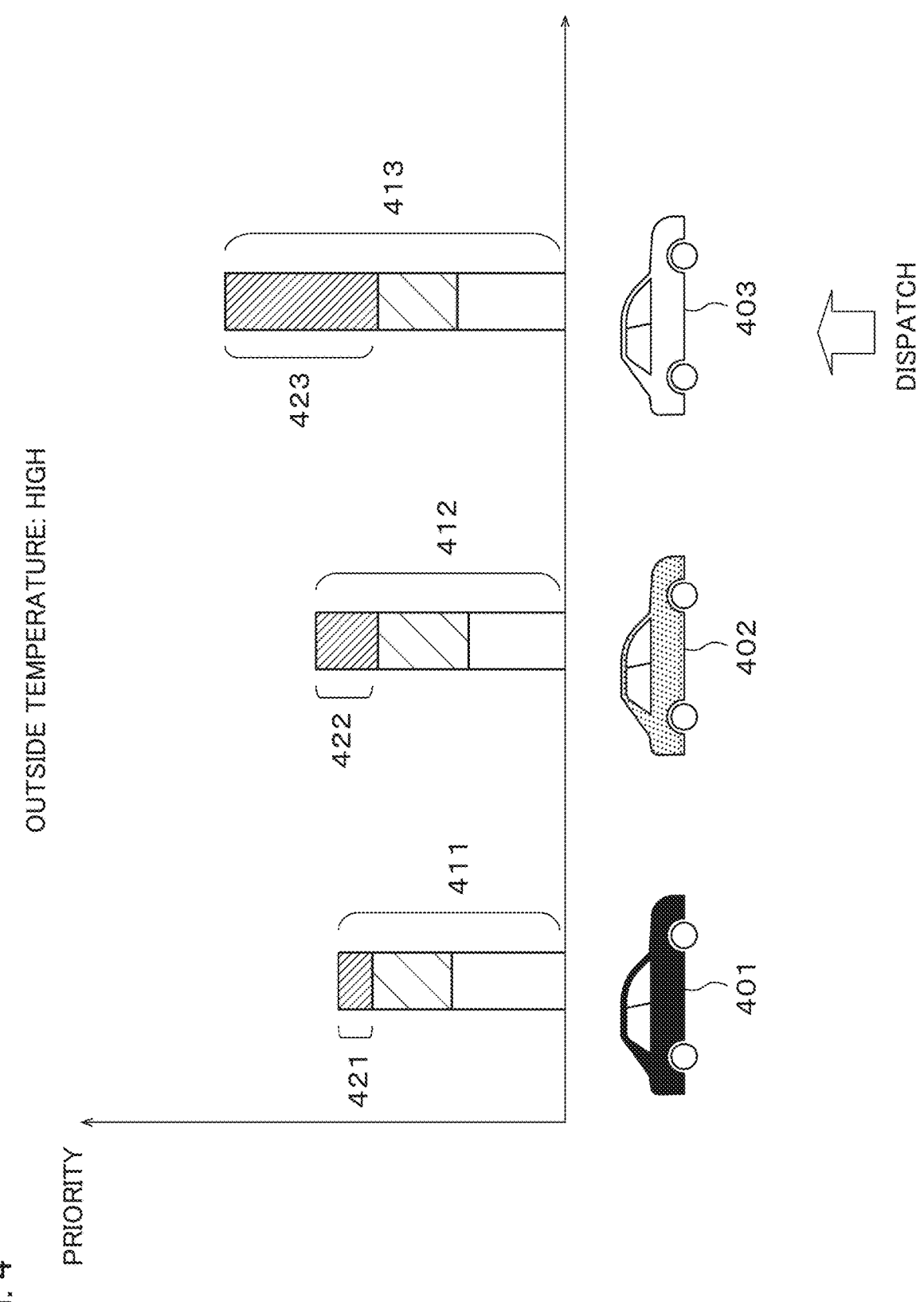
FIG. 4 is a diagram illustrating an example of determination of a vehicle to be dispatched based on a priority.

FIG. 4 is a diagram illustrating an example of determination of a vehicle to be dispatched based on a priority. In the example illustrated in FIG. 4, it is assumed that there are three candidate vehicles 401, 402, and 403. In this example, it is assumed that the item priority regarding the external environment suitability is set based on the suitability degree of the body color of the candidate vehicle with respect to the outside temperature as the external environment. Further, in this example, it is assumed that the outside temperature is higher than the high temperature threshold, and the body color of each of the candidate vehicles 401 to 403 is black, dark gray, and white. In FIG. 4, the vertical axis represents priority, and priority levels 411 to 413 of candidate vehicles 401 to 403 are shown.

In this case, since the density of the body color of the candidate vehicle 401 and the density of the body color of the candidate vehicle 402 are high, the degrees of suitability of the body colors of the candidate vehicle 401 and the candidate vehicle 402 with respect to the outside air temperature are low. Therefore, the item priority 421 of the candidate vehicle 401 and the item priority 422 of the candidate vehicle 402 regarding the outside temperature are relatively small values. On the other hand, since the density of the body color of the candidate vehicle 403 is low, the degree of suitability of the body color of the candidate vehicle 403 with respect to the outside temperature is high. Therefore, the item priority 423 of the candidate vehicle 403 regarding the outside temperature has a relatively large value. As a result, the priority 413 of the candidate vehicle 403 is the highest among the priorities 411 to 413 of the candidate vehicles 401 to 403. Therefore, the candidate vehicle 403 is determined as a vehicle to be dispatched.

The dispatch vehicle determination unit 43 notifies the pickup instruction unit 44 of the identification information of the vehicle to be dispatched.

The pickup instruction unit 44 generates a pick-up instruction including the planned boarding location included in the dispatch request for the vehicle specified by the identification information notified from the dispatched vehicle determination unit 43. The pickup instruction unit 44 transmits the generated pick-up instruction to the vehicle to be dispatched via the communication interface 31, the communication network 4, and the wireless base station 5. Note that the pick-up instruction may include identification information of the user who has transmitted the dispatch request, a planned getting-out location of the user, and information indicating a planned traveling route.

Figure 5:
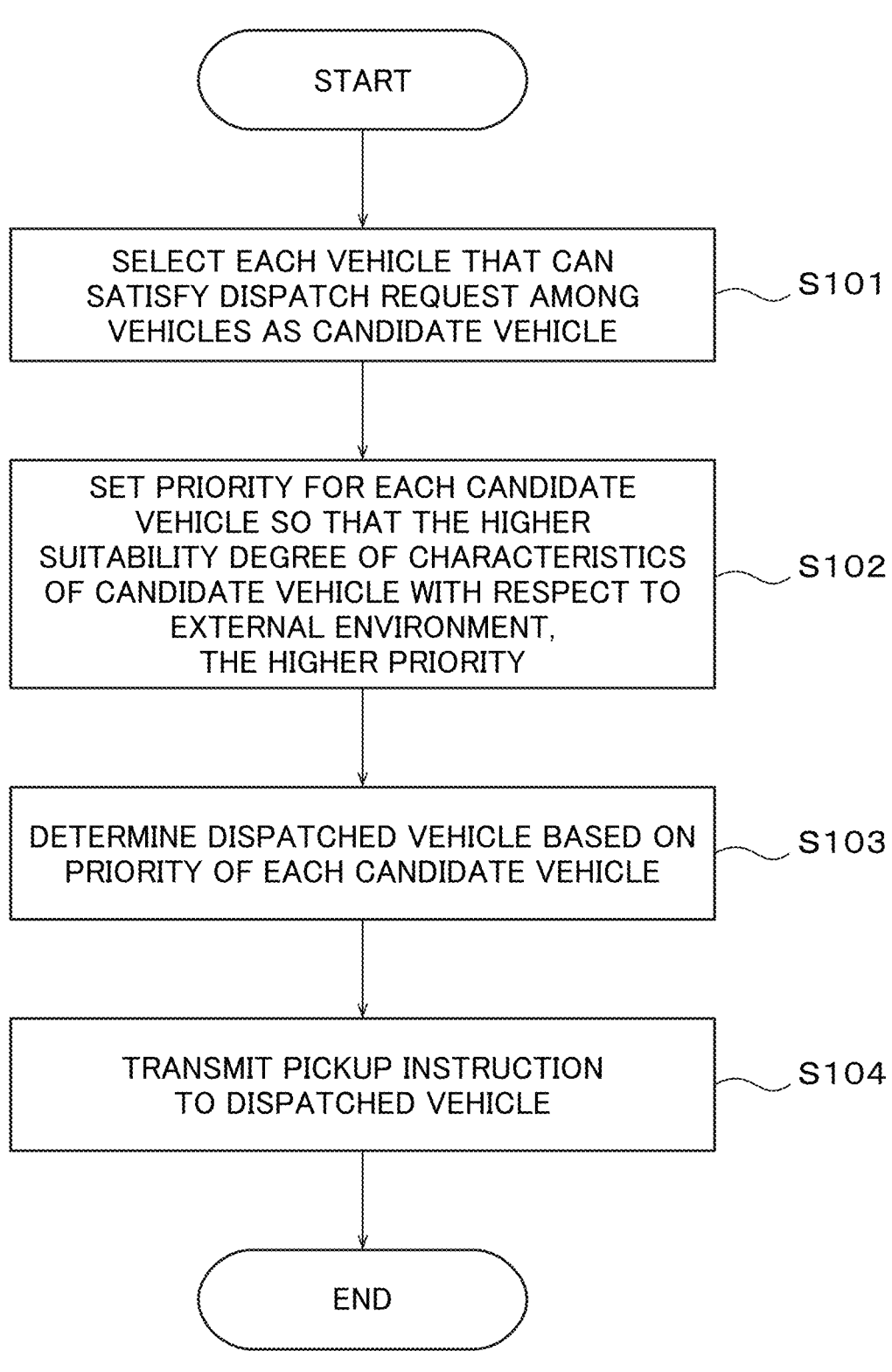
FIG. 5 is an operation flowchart of the dispatch management process.

FIG. 5 is an operation flowchart of the dispatch management process. Each time the dispatch request is received, the processor 34 executes the dispatch management process according to the operation flowchart shown below.

The selection unit 41 selects one or more vehicles that can satisfy the dispatch request from among the plurality of vehicle 2-1 to 2-*n* as candidate vehicles (step S101). The priority setting unit 42 sets the priority for each candidate vehicle such that the higher the degree of suitability of the characteristics of the candidate vehicle with respect to the external environment is, the higher the priority is (step S102). The dispatched vehicle determination unit 43 determines the vehicle to be dispatched from among the candidate vehicles based on the priorities set for the respective candidate vehicles (step S103). The pickup instruction unit 44 transmits a pick-up instruction to the vehicle to be dispatched via the communication network 4 or the like (step S104). Then, the processor 34 terminates the dispatch management process.

As described above, as a reference for determining the vehicle to be dispatched, the dispatch management device sets a priority for each candidate vehicle such that the higher the degree of suitability of the characteristics of the candidate vehicle with respect to the external environment is, the higher the priority is. Therefore, the dispatch management device can determine a vehicle to be dispatched from among the candidate vehicles so that the vehicle suitable for the external environment is easily dispatched.

According to a modification, the item priority may be set based on external environment other than outside temperature and weather. For example, the item priority may be set based on the type of the road included in the planned traveling route and the degree of suitability of the characteristics of the vehicle. In this case, when the length of the highway section included in the planned traveling route specified by the dispatch request is equal to or greater than a predetermined distance (for example, 10 km, 20 km or ½ of the total length of the planned traveling route), the priority setting unit 42 may set the item priority of the candidate vehicle that is BEV to be lower than the item priority of the candidate vehicle having the type of the power source other than BEV. As a result, when a vehicle that is dispatched over a certain length of the expressway travels, the engine-driven vehicle or the hybrid-driven vehicle that is superior in fuel efficiency to BEV is easily dispatched in the high-speed steady-state traveling, so that the fuel efficiency and the electric power consumption of the entire dispatch management system are expected to be improved.

Conversely, when the planned traveling route is a route passing through the urban area and the scheduled boarding date and time specified in the dispatch request is included in a time zone corresponding to night or early morning (for example, 10:00 p.m. to 6:00 a.m.), the priority setting unit 42 may set the item priority of the candidate vehicle that is BEV to be higher than the item priority of the candidate vehicle having the type of the power source other than BEV. As a result, the candidate vehicle of BEV having a relatively small of noise during traveling is easily dispatched, so that the noise when the dispatched vehicle travels in the urban area is suppressed.

Furthermore, the external environment may be the presence or absence of a charging station existing within a predetermined range from the planned traveling route. When the charging station existing within the predetermined range from the planned traveling route is not confirmed, the priority setting unit 42 may set the item priority of the candidate vehicle that is BEV to be lower than the item priority of the candidate vehicle having the type of the power source other than BEV. This reduces the possibility of insufficient remaining battery capacity while the dispatched vehicle is traveling.

The computer program that causes the computer to execute the processing executed by the processor 34 of the server 3 may be distributed by being recorded on a recording medium such as an optical recording medium or a magnetic recording medium.

As described above, a skilled person can make various modifications according to the embodiment within the scope of the present disclosure.

What is claimed is:

1. A dispatch management system, comprising:
   a plurality of candidate vehicles; and
   a dispatch management device comprising:
     a processor configured to:
       set, for each of the plurality of candidate vehicles that can be dispatched, a priority of the candidate vehicle in response to external environment and characteristics of the candidate vehicle associated with the external environment so that the priority becomes higher as a degree of suitability of the characteristics of the candidate vehicle with respect to the external environment increases, and
       determine a vehicle to be dispatched from among the plurality of candidate vehicles in response to the priority of each of the plurality of candidate vehicles, and
       control autonomous driving of the vehicle to be dispatched by controlling an electronic control unit of the vehicle, including: i) controlling a velocity of the vehicle so that a distance from other objects existing around the vehicle is maintained at a predetermined value or more based on information from a sensor; and ii) executing the autonomous driving of the vehicle that causes the vehicle to move to a planned boarding location or a planned getting-out location along a travel route included in a pick-up instruction,
     wherein the external environment includes outside temperature, and the characteristics include a body color, and wherein the processor sets the priority for each of the plurality of candidate vehicles so that the priority of the candidate vehicle becomes higher as a density of the body color of the candidate vehicle is lower when the outside temperature is equal to or higher than a predetermined high temperature threshold, and the priority of the candidate vehicle becomes higher as the density of the body color of the candidate vehicle is higher when the outside temperature is equal to or less than a predetermined low temperature threshold.

2. The dispatch management system according to claim 1, wherein the external environment further includes a road surface condition, the characteristics include a drive system, and wherein the processor sets the priority of the candidate vehicle having a four-wheel drive system among the plurality of candidate vehicles to be higher than the priority of the candidate vehicle having the other drive system when a friction coefficient of the road surface is estimated to be lower than a predetermined value.

3. A dispatch management system, comprising:
a plurality of candidate vehicles; and
a dispatch management device, comprising:
    a processor configured to:
    set, for each of the plurality of candidate vehicles that can be dispatched, a priority of the candidate vehicle in response to external environment and characteristics of the candidate vehicle associated with the external environment so that the priority becomes higher as a degree of suitability of the characteristics of the candidate vehicle with respect to the external environment increases, and
    determine a vehicle to be dispatched from among the plurality of candidate vehicles in response to the priority of each of the plurality of candidate vehicles, and
    control autonomous driving of the vehicle to be dispatched by controlling an electronic control unit, including: i) controlling a velocity of the vehicle so that a distance from other objects existing around the vehicle is maintained at a predetermined value or more based on information from a sensor; and ii) executing the autonomous driving of the vehicle that causes the vehicle to move to a planned boarding location or a planned getting-out location along a travel route included in a pick-up instruction,
wherein the external environment includes weather, the characteristics include presence or absence of a photovoltaic panel, and wherein the processor increases the priority of the candidate vehicle including the photovoltaic panel among the plurality of candidate vehicles as the weather becomes better.

4. A dispatch management system, comprising:
a plurality of candidate vehicles; and
a dispatch management device, comprising:
    a processor configured to:
    set, for each of the plurality of candidate vehicles that can be dispatched, a priority of the candidate vehicle in response to external environment and characteristics of the candidate vehicle associated with the external environment so that the priority becomes higher as a degree of suitability of the characteristics of the candidate vehicle with respect to the external environment increases, and
    determine a vehicle to be dispatched from among the plurality of candidate vehicles in response to the priority of each of the plurality of candidate vehicles, and
    control autonomous driving of the vehicle to be dispatched by controlling an electronic control unit, including: i) controlling a velocity of the vehicle so that a distance from other objects existing around the vehicle is maintained at a predetermined value or more based on information from a sensor; and ii) executing the autonomous driving of the vehicle that causes the vehicle to move to a planned boarding location or a planned getting-out location along a travel route included in a pick-up instruction,
wherein the external environment includes outside temperature, the characteristics include an elapsed time from a previous use, and wherein the processor sets the priority for each of the plurality of candidate vehicles so that the priority of the candidate vehicle becomes higher as the elapsed time of the candidate vehicle is shorter when the outside temperature is less than a predetermined temperature.

* * * * *